United States Patent [19]
Arlemark

[11] Patent Number: 5,950,065
[45] Date of Patent: Sep. 7, 1999

[54] METHOD AND DEVICE FOR PRODUCING OZONE

[76] Inventor: Jan Arlemark, Vikensväg 73 B, S-236 42 Höllviken, Sweden

[21] Appl. No.: 08/983,590
[22] PCT Filed: Jun. 26, 1996
[86] PCT No.: PCT/SE96/00839
  § 371 Date: Jun. 1, 1998
  § 102(e) Date: Jun. 1, 1998
[87] PCT Pub. No.: WO97/01507
  PCT Pub. Date: Jan. 16, 1997

[30] Foreign Application Priority Data
Jun. 28, 1995 [SE] Sweden .................................. 9502339

[51] Int. Cl.⁶ .................................................... B01J 19/08
[52] U.S. Cl. ..................................... 422/186.2; 422/186.07
[58] Field of Search ............................. 422/186.07, 186.2

[56] References Cited

U.S. PATENT DOCUMENTS 3,899,685  8/1975  Francis et al. ...................... 422/186.07
4,034,229  7/1977  Grossen et al. ..................... 422/186.07

Primary Examiner—K. Mayekar
Attorney, Agent, or Firm—James Ray & Associates

[57] ABSTRACT

Ozone is produced in that oxygen is subjected to a high frequency alternating current with high voltage over a dielectricum. Oxygen is admitted to a narrow space between two plates (2) of aluminum oxide, and the current is applied to an electrode net (3) in the space, whereas the opposite sides of the plates are earthed and cooled.

6 Claims, 3 Drawing Sheets

METHOD AND DEVICE FOR PRODUCING OZONE

This is a National Stage application of PCT/SE96/00839, filed Jun. 26, 1996.

TECHNICAL FIELD

The present invention relates to a method and device for producing ozone by subjecting oxygen to a high frequency alternating current with high voltage over a dielectricum.

BACKGROUND OF THE INVENTION

Ozone gas is used to an increasing extent in many industrial applications, not the least waste water treatment, where it can destruct or remove for example complex organic molecules, cyanides and phenols from chemical waste, waste from paper plants and dye-mills, surfactants and detergents from washing processes, odors from waste water plants.

Waste water treated in a final step with ozone can without difficulty be reused for washing, irrigation or fire fighting.

Ozone is further used for pretreating drinking water, enhancing its quality considerably.

Last but not least ozone is used as the only acceptable alternative to chlorine for bleaching pulp in the paper making industry.

The demand for ozone is accordingly very high and steadily increasing.

It is well known that ozone is generated by so called dark or cold electrical discharges in oxygen gas or oxygen-rich gas mixtures. Presently known devices for generating ozone in satisfactory quantities and concentrations for industrial applications, however, are very voluminous and are difficult and expensive to service.

Known oxygen generators are often constructed in large, hermetically enclosed metal containers, which makes them very sensitive to moisture, both external and in the supplied gas, from which the ozone is generated. Already at low moisture contents leak currents may occur with resultant risks for electrical short-circuits, leading to the destruction of the generator unit in question.

The objects of the invention are to increase the yield from the ozone making process, to decrease the physical dimensions of the device, to decrease the moisture sensitivity, and to minimize the stoppage times at service.

THE INVENTION

These objects are according to the invention fulfilled in that oxygen gas is admitted to a narrow space with at least one plane wall of a material constituting the dielectricum and that the high frequency alternating current with high voltage is applied to a thread shaped electrode in the space, the opposite side of the wall being earthed and cooled.

Preferably, the narrow space has two plane walls of a material constituting dielectrica.

In one embodiment earthed metal blocks containing cooling medium are applied against the walls.

In another embodiment an earthed cooling medium is applied directly against the walls. This is obtained in that generator units—each formed by the walls with the internal electrode—are submerged in the earthed cooling medium.

BRIEF DESCRIPTION OF THE DRAWINGS

The invention will be described in further detail below reference being made to the accompanying drawings, in which.

DETAILED DESCRIPTION OF EMBODIMENTS

Figure 1:
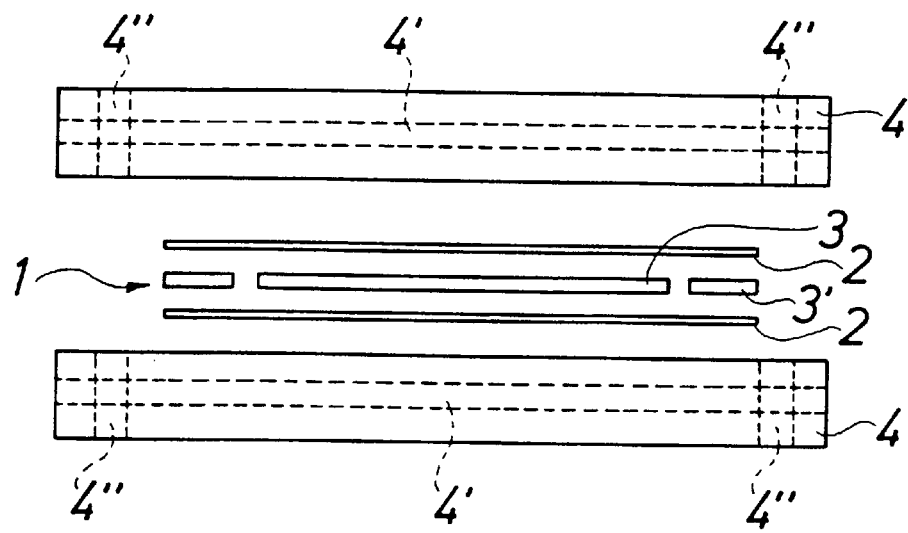
FIG. 1 is a schematic illustration of the basic construction of a unit in an ozone generator according to a first embodiment of the invention.
Figure 2:
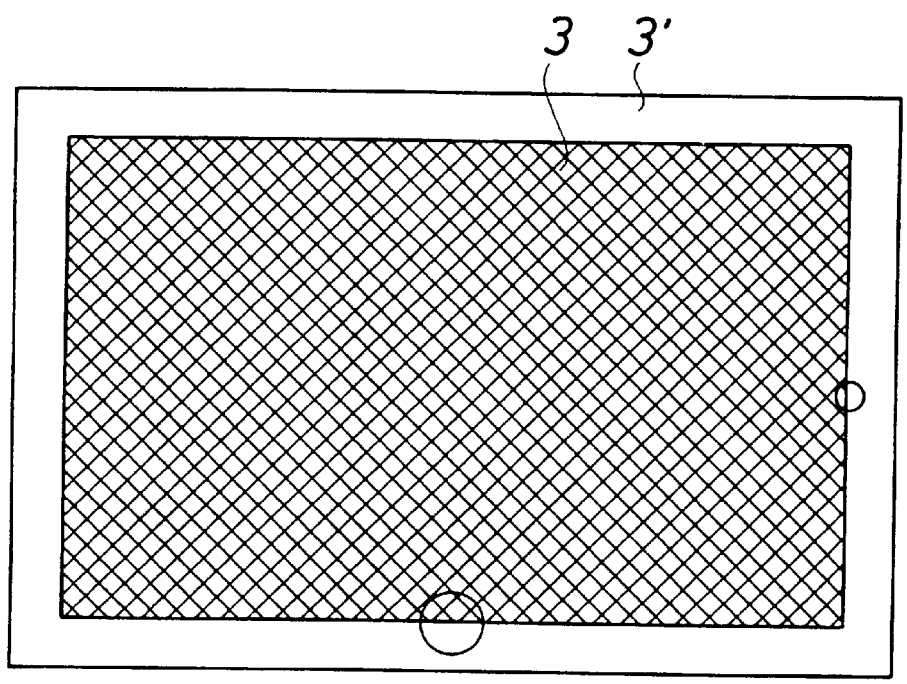
FIG. 2 is a top view of an electrode net for use in an ozone generator as illustrated in FIG. 1.
Figure 3:
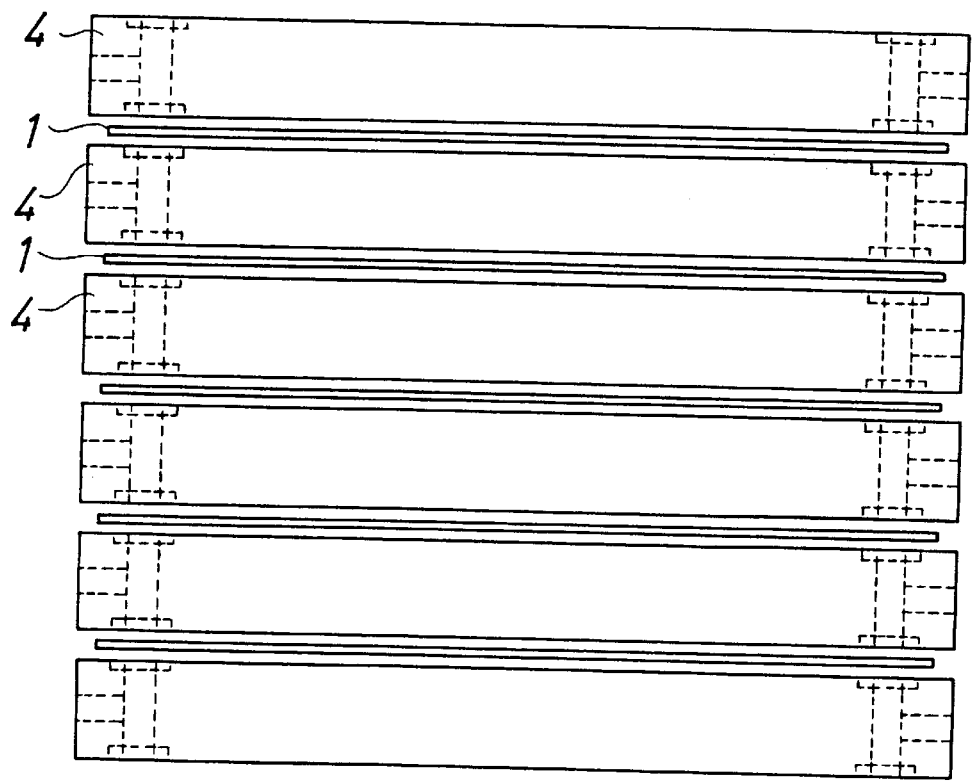
FIG. 3 is a side view of an ozone generator according to the first embodiment.

An ozone generator according to a first embodiment of the invention is schematically depicted in FIGS. 1–3.

As shown in FIG. 1, an ozone generator unit 1 comprises two plates 2 of pure aluminum oxide or alumina, a ceramic material. It is desirable to use an aluminum oxide with a purity of 99.9% or even better. Each such plate may for example have the dimensions length 160 mm, width 115 mm and thickness 0.65 mm.

A metal electrode 3 in the form of a net of acidproof stainless steel or the like is arranged between the two ceramic plates 2. The net 3, also shown in FIG. 2, is surrounded by a frame 3', which is made of the same material as the plates and may have a thickness of 0.5 mm providing a space with the same height between the two plates 2. The plates 2 and the frame 3' are interconnected to a gas tight unit, for example by means of glass as glue.

As an alternative to providing a separate net in the space, thread-shaped electrode material may be arranged on the inner surfaces of the plates 2.

Each generator unit 1 is provided with openings for the admission of oxygen gas ($O_2$) to and the removal of formed ozone gas ($O_3$) in oxygen gas from the space between the plates 2. Also, there is an electrical connection to the net 3.

In order to cool the generator unit 1 and to provide an electrical earth for the system, in which the net 3 constitutes the phase, metal blocks 4 are arranged at either side of the generator unit 1. Each metal block 4 is provided with channels 4' for a suitable cooling medium and bores 4" for the administration of gas to and from the generator unit 1. The block 4 is connected to earth and the net 3 to a source for high voltage. Neither the fluid connections nor the electrical connections are shown in the drawings.

The cooling medium circulated through the metal blocks 4 is preferably a mixture of water and glycol or another alcohol. It is circulated by means of a compressor in such amounts and speeds that the temperature rise of the medium during a passage through the block 4 can be in the magnitude of 1° C. at a chosen working temperature of −5° C.

In the described system, each plate 2 functions as a dielectricum, when the net 3 is connected to an alternating current and the blocks 4 to earth. The voltage of the preferably sinusiodal alternating current may preferably be in the order of 6,000 V, but theoretically voltages as high as 25,000–30,000 V may be used, if a break-through is obtained at the level 35,000 V. The frequency of the alternating current may be in the region of 2–100 kHz, preferably 2.5 kHz.

When this current is applied to the net 3, a so called cold discharge with a corona effect is obtained through the dielectricum constituted by the plates 2 between the line-shaped net portions and the earthed surfaces of the metal blocks 4. Hereby a certain portion of the oxygen transmitted through the generator unit 1 is converted into ozone. Under the circumstances described above the result may be as high as 1814 20 vol. % ozone in the oxygen gas, whereas a result of only 3–11 vol. % oxygen may be obtained in conventional processes. An oxygen mixture with a higher ozone content than 18% may be spontaneously explosive.

The oxygen may be given a certain over-pressure of for example 0.5 bar at the introduction into the generator unit 1 so as to ensure a proper transport therethrough. Also the oxygen gas may be forced to follow a winding path through the space in the generator unit 1—by the provision of internal partition walls—so as to increase the time and distance for the oxygen in the unit.

It is preferred to keep the working temperature of the dielectricum at 20° C., although higher temperatures of maximum 60–80° C. are possible, and hereby about 80% of the supplied electric energy is transformed to heat, which has to be cooled away.

Under the described circumstances, the yield from each generator unit may be in the order of 20 g/h, which means that 50 generator units or elements are required for producing 1 kg ozone/h. This amount may for example be needed for cleaning the waste water from about 2,000 households.

FIG. 3 illustrates a stack of generator units 1 and blocks 4. Such a stack may contain a plurality of units and blocks—many more than the five units and six blocks shown.

A second embodiment of an ozone generator according to the invention is shown in FIGS. 4–7. The main difference in relation to the first embodiment according to FIGS. 1–3 is that in this case the metal blocks are missing and that the generator units, in this case bearing the numeral 10, are submerged in a liquid, which both constitutes the cooling medium and the electrical earth.

Figure 6:
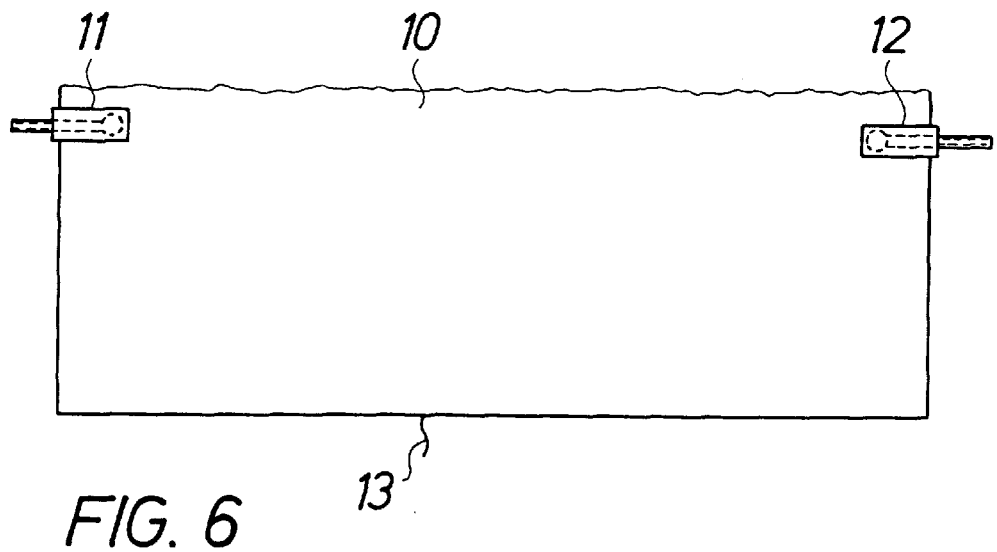
FIG. 6 is a top view of a generator unit for the embodiment according to FIGS. 4 and 5.
Figure 7:
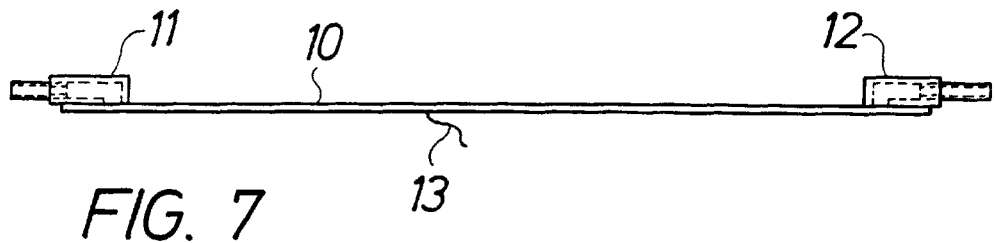
FIG. 7 is a side view of the generator unit according to FIG. 6.

A generator unit 10 for this embodiment is shown in FIGS. 6 and 7. The unit 10 in itself is not in principle different from the unit 1 for the first embodiment. It comprises two plates constituting dielectrica and in a gastight space therebetween an electrode net. The unit 10 is provided with an inlet 11 for oxygen and an outlet 12 for the formed mixture of ozone and oxygen. It is also provided with an electrical connection 13 for the electrode net.

Figure 4:
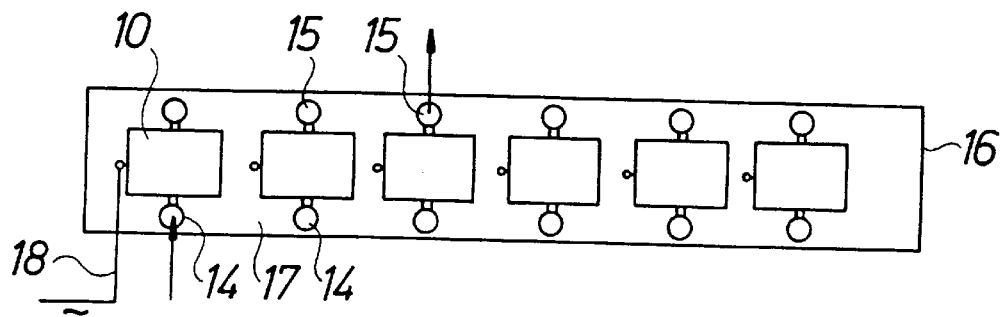
FIG. 4 is a top view of a second embodiment of an ozone generator according to the invention.
Figure 5:
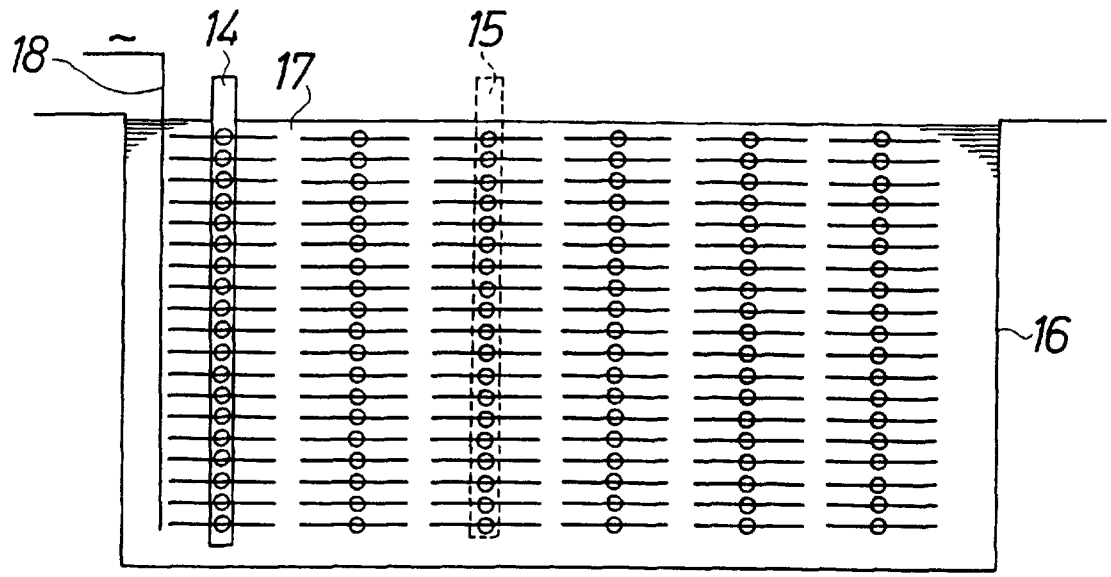
FIG. 5 is a side view of the embodiment according to FIG. 4.

A stack of such generator units 10 may be suspended between an inlet tube 14 for oxygen and an outlet tube 15 for ozone/oxygen, the stack being submerged in a container 16 in a liquid 17. There is also an isolated electrical cable 18 for supply of the alternating current to the generator units 10. Several such stacks, for example six, each containing a relatively large number of generator units 10, may be arranged in one container 16; in the shown case the number is 19. For the sake of clarity, only one inlet tube 14 is shown with solid lines in FIG. 5 and one outlet tube 15 with dotted lines. In FIG. 4 the flow of oxygen to and ozone/oxygen from the stacks of generator units 10 is illustrated by means of arrows.

The liquid 17 used in the container 16, which is to be connected to earth or is to be provided with earth plates, shall be an electrically good conductor for high frequency voltages, which is the case for water. For practical reasons the same liquid can be used as was used as the cooling medium in the first embodiment. It may be of advantage to keep the liquid 17 in a certain movement in the container 16.

For a corresponding number of generator units the arrangement of the second embodiment may be more effective, i e consume less energy. It may also be volume effective in that the distance between neighbouring generator units 10 can be kept as low as 5 mm.

I claim:

1. In a device for producing ozone by subjecting oxygen in a narrow space between two walls (2) of a dielectric material to a high frequency alternating current with high voltage, wherein the space contains a plane electrode (3) and the walls are externally earthed and cooled the improvement comprising, that the plane electrode (3) made of a thread shaped material substantially fills said narrow space for oxygen gas and in that said device (1) comprising the walls (2) and the electrode (3) is manufactured to a sealed unit.

2. A device according to claim 1, wherein the two walls (2) are made of a ceramic material.

3. A device according to claim 2, wherein the ceramic material is aluminium oxide and the electrode (3) is of acidproof stainless steel.

4. A device according to claim 2, the improvement further comprising that an earthed metal block (4) containing cooling medium is arranged directly at either side of said device.

5. A device according to claim 2, the improvement further comprising that said device is submerged in a earthed cooling medium (17).

6. A device according to claim 5, the improvement further comprising that several of said device (1) are suspended as a stack between an inlet tube (14) for oxygen and an outlet tube (15) for ozone/oxygen in the earthed cooling medium (17).

* * * * *